United States Patent
Aguiar et al.

(10) Patent No.: US 11,176,549 B2
(45) Date of Patent: Nov. 16, 2021

(54) SYSTEMS AND METHODS FOR MATCHING TRANSACTIONAL DATA

(71) Applicant: SAP SE, Walldorf (DE)

(72) Inventors: Everaldo Aguiar, Bellevue, WA (US);
Michael Stark, Bellevue, WA (US);
Jesper Lind, Bellevue, WA (US)

(73) Assignee: SAP SE, Walldorf (DE)

( * ) Notice: Subject to any disclaimer, the term of this patent is extended or adjusted under 35 U.S.C. 154(b) by 662 days.

(21) Appl. No.: 15/951,058

(22) Filed: Apr. 11, 2018

(65) Prior Publication Data
US 2019/0318347 A1 Oct. 17, 2019

(51) Int. Cl.
*G06Q 20/38* (2012.01)
*G06Q 20/40* (2012.01)
*G06K 9/18* (2006.01)
*G06N 20/00* (2019.01)

(52) U.S. Cl.
CPC .............. *G06Q 20/389* (2013.01); *G06K 9/18* (2013.01); *G06N 20/00* (2019.01); *G06Q 20/4016* (2013.01)

(58) Field of Classification Search
CPC .. G06Q 20/389; G06Q 20/4016; G06N 20/00; G06K 9/18
See application file for complete search history.

(56) References Cited

U.S. PATENT DOCUMENTS

| | | | | |
|---|---|---|---|---|
| 5,581,630 | A * | 12/1996 | Bonneau, Jr. .......... | G07C 9/253 382/116 |
| 9,916,606 | B2 * | 3/2018 | Stroh .................... | G06Q 30/04 |
| 10,127,247 | B1 * | 11/2018 | Arora .................... | G06T 1/0007 |
| 10,134,023 | B2 * | 11/2018 | Zhgeng ................ | G06Q 20/227 |
| 10,157,425 | B2 * | 12/2018 | Chelst .................... | G06Q 40/12 |
| 10,762,512 | B2 * | 9/2020 | Benjamin .............. | G06Q 30/02 |
| 10,922,539 | B2 * | 2/2021 | Chawda ............ | G06K 9/00463 |
| 2009/0099996 | A1 * | 4/2009 | Stefik .................... | G06F 16/355 706/54 |
| 2009/0276368 | A1 * | 11/2009 | Martin .................. | G06Q 40/02 705/36 R |

(Continued)

OTHER PUBLICATIONS

Maurya, Chandresh Kumar, et al. "Online similarity learning with feedback for invoice line item matching." arXiv preprint arXiv: 2001.00288 (2020). (Year: 2020).*

*Primary Examiner* — Asfand M Sheikh
(74) *Attorney, Agent, or Firm* — Fountainhead Law Group P.C.

(57) ABSTRACT

Embodiments of the present disclosure pertain to matching transactional data. In one embodiment, the present disclosure includes a computer implemented method comprising receiving transactional data for a first user and second data for the first user, selecting transactional data records for the first user from a data store of transactional data for a plurality of users, determining a plurality of similarities between fields of the transactional data and second data, determining a likelihood of a match between a transactional data field and a second data field based on the plurality of similarities using a machine learning model, and in accordance therewith, identifying one record in the transactional data records for the first user that generates said likelihood of the match above a first threshold, and replacing values second data fields with corresponding values in the one record.

20 Claims, 4 Drawing Sheets

(56) References Cited

U.S. PATENT DOCUMENTS

| | | | | |
|---|---|---|---|---|
| 2010/0306168 | A1* | 12/2010 | Ostad | G06Q 10/087 707/603 |
| 2012/0290609 | A1* | 11/2012 | Britt | G06F 16/951 707/769 |
| 2014/0006198 | A1* | 1/2014 | Daly | G06Q 30/06 705/24 |
| 2014/0074675 | A1* | 3/2014 | Calman | G06Q 20/047 705/35 |
| 2015/0032480 | A1* | 1/2015 | Blackhurst | G06Q 40/08 705/4 |
| 2015/0032615 | A1* | 1/2015 | Blackhurst | G06Q 20/108 705/42 |
| 2015/0032616 | A1* | 1/2015 | Blackhurst | G06Q 40/02 705/42 |
| 2015/0331936 | A1* | 11/2015 | Alqadah | G06F 16/313 707/739 |
| 2015/0382263 | A1* | 12/2015 | Jain | H04W 76/10 455/432.1 |
| 2016/0042469 | A1* | 2/2016 | Lochrie | G06F 16/3344 705/30 |
| 2016/0055568 | A1* | 2/2016 | Vidal | G06Q 30/00 705/26.7 |
| 2017/0039286 | A1* | 2/2017 | Walke | G06F 16/254 |
| 2017/0255793 | A1* | 9/2017 | Caldwell | G06F 21/31 |
| 2018/0025340 | A1* | 1/2018 | Schlosser | G06Q 20/227 705/24 |
| 2018/0121978 | A1* | 5/2018 | Lorenzini | G06Q 20/389 |
| 2018/0357753 | A1* | 12/2018 | Lehtinen | G06N 3/08 |

* cited by examiner

SYSTEMS AND METHODS FOR MATCHING TRANSACTIONAL DATA

BACKGROUND

The present disclosure relates to computing, and in particular, to systems and methods for matching transactional data.

In modern computing, it is often the case that data is received from a variety of sources at different times. Applications using such data are often faced with the challenge of matching incoming data from multiple sources. For example, data from two or more distinct sources may be related, and it is often challenging for the receiving system to discern which data elements go together and which do not. Accordingly, it is sometimes the case that related data is stored redundantly as a plurality of distinct records when in fact such data may be redundant and/or related to other data already in the system. There are many causes of this problem. One cause may relate to the data being coded (e.g., abbreviated, appended with additional characters) in one or more data streams and not coded, or coded differently, in other data streams.

One particular example of data matching is in the context of transaction data feeds, such as credit cards, for example. One problem with transactional data feeds is that data in such feeds can be coded in a variety of cryptic ways. Furthermore, the amount of the transactions can change between the time of a first card swipe and a later time. Matching data to these and other transactional data is a challenge for systems that store and process such data.

Embodiments of the disclosure provide advantageous techniques for matching data streams.

SUMMARY

Embodiments of the present disclosure pertain to matching transactional data. In one embodiment, the present disclosure includes a computer implemented method comprising receiving transactional data for a first user and second data for the first user, selecting transactional data records for the first user from a data store of transactional data for a plurality of users, determining a plurality of similarities between fields of the transactional data and second data, determining a likelihood of a match between a transactional data field and a second data field based on the plurality of similarities using a machine learning model, and in accordance therewith, identifying one record in the transactional data records for the first user that generates said likelihood of the match above a first threshold, and replacing values second data fields with corresponding values in the one record.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
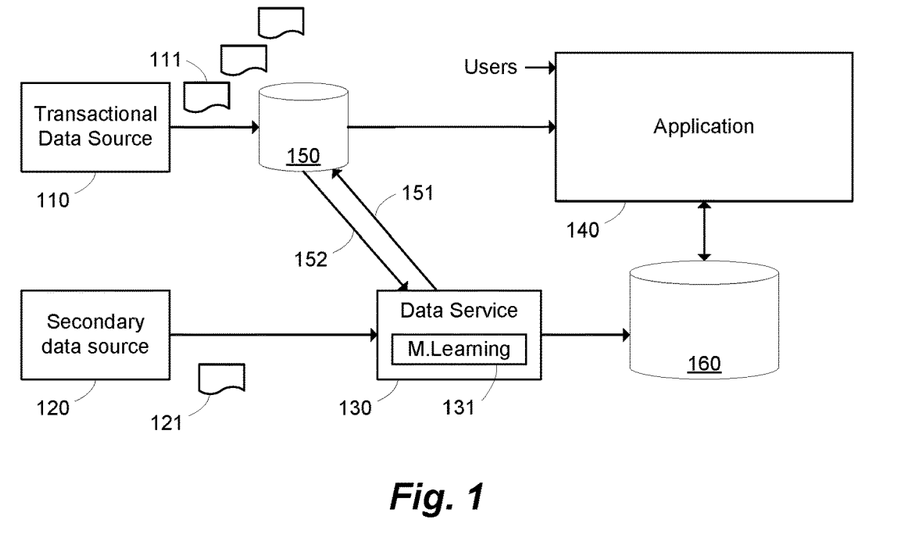
FIG. 1 illustrates a transactional data matching system according to one embodiment.

FIG. 1 illustrates a transactional data matching system according to one embodiment. Features and advantages of the present disclosure include techniques for matching related data received across different data streams potentially at different times and coded in different ways. Example embodiments may allow related data to be stored in a single database record together and reduce the amount of redundant or disparate data stored in a system. In this example, transactional data 111 may be generated by a transactional data source 110 and stored in a data store 150, such as a data repository or database, for example. A second data source 120 may generate second data 121, which may be related to one or more records of the transactional data 111, for example. Second data 121 may be received by a data service 130. Transactional data 111 in data store 150 may include data from numerous users, for example, whereas second data 121 may be a second data stream of data for the same or an overlapping set of the users.

Advantages of the techniques described herein include searching and matching second data 121 (e.g., for a first user) with one of the transactional data records 111 (e.g., for the same user) stored in data store 150, for example. A data service 130 receives second data 121. The second data 121 may include a plurality of fields corresponding to at least a portion of a plurality of fields in each record of transactional data 111 in data store 150, for example. Transactional data 111 for a particular user may be queried at 151, for example, and received at 152 in data service 130. As mentioned above, the transactional data 111 may include a plurality of records, where each record includes a plurality of fields. Some of the fields in transactional data 111 may correspond (or overlap) with fields in second data 121, for example. Accordingly, transactional data records for the first user may be selected from transactional data 111 for a plurality of users stored in data store 150 (e.g., using a particular field or fields in the second data 121).

Data service 130 analyzes the retrieved transactional data for the user and attempts to match one transactional data record with second data 121 for the same user. Data service 130 may be configured to determine a plurality of similarities between fields in the second data 121 and fields in the transactional data 111. For instance, data service 130 may generate similarities from fields of the transactional data records 111 for the first user and corresponding fields from second data 121 for the first user, for example. Once similarities are generated between corresponding fields in the second data and the transactional data, data service 130 analyze the similarities using a machine learning component 131. Machine learning component 131 may determine a likelihood of a match between the fields of the transactional data records 121 for the first user and fields of the second data 111 for the first user based on the plurality of similarities using a machine learning model, for example. Machine learning component 131 may process the similarities between each transactional data record 121 and the second data 111 to produce one or more likelihoods. When a likelihood of the match is above a first threshold, the transactional data record 121 producing such a likelihood is determined to be a match with the second data record 121. Accordingly, one record in the transactional data records 121 for the first user may be identified as a match. When a match is found, data service 131 may replace one or more of values in the fields in the second data 121 with one or more corresponding values in fields from the identified one record. Data service 130 then stores the second data, including the fields where values were replaced with values from the matching transactional data record, into a database 160. Machine learning model 131 may be trained with a corpus of known transactional data records and matching second data records, for example. In one embodiment, machine learning model is trained using a corpus of transactional data records and matching second data records as well as a corpus of transactional data records and corresponding second data records that do not match. The number of non-matching records used for training may be a multiple of the number of matching records, for example. An example machine learning model using a Random Forest algorithm is illustrated below.

As illustrated in FIG. 1, database 160 may store data used by an application 140. Application 140 may also use data from data store 150, for example. Application 140 may receive or otherwise access data 150 at a different time before or after second data 121 has been stored in database 160, for example. However, after the second data is stored in database 160, it has fields with values from transactional data 111. Accordingly, transactional data 111 flowing into data store 150 and application 140 may be accurately matched with data records in database 160 because certain fields of records in database 160 are derived from values in transactional data records 121. There are many applications 140 where such techniques can advantageously improve data storage and processing.

Figure 2:
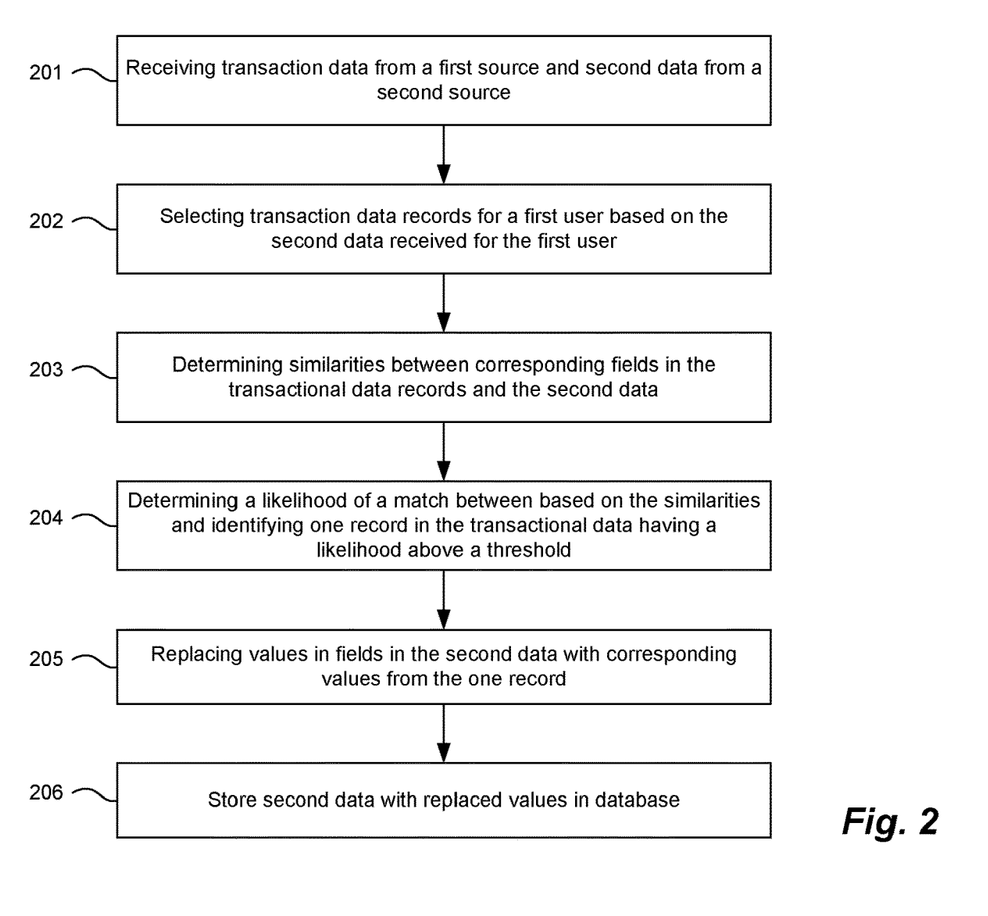
FIG. 2 illustrates processing transactional data according to one embodiment.

FIG. 2 illustrates processing transactional data according to one embodiment. At 201, transactional data for a first user is received (e.g., in a data store 150) from a first source. The transactional data comprises a plurality of records, and each record comprises a plurality of fields. Furthermore, at 201, second data for the first user is received (e.g., in a data service 130) from a second source. The second data comprises a plurality of fields corresponding to at least a portion of the plurality of fields of transactional data. In one example implementation described below, the transactional data is credit card feeds for many users including the first user, and the second data is a record generated from optical character recognition (OCR) of an image of a receipt produced by taking a picture of the receipt, for example. This is just one example of an instance where related data flows into a system from different sources at different times and needs to be matched. At 202, the transactional data records for the first user are selected from a data store of transactional data for a plurality of users (e.g., by a query from data service 130). At 203, the process determines a plurality of similarities between fields of each transactional data record for the first user and corresponding fields from the second data for the first user. The transactional data records for the first user and the second data record for the first user may have many overlapping fields. However, the system may be configured to generate different similarities for particular fields determined to be most indicative of, or helpful in finding, a match, for example. At 204, the process determines a likelihood of a match between the fields of the transactional data records and the fields for the second data based on the plurality of similarities using a machine learning model, and in accordance therewith, identifies one record in the transactional data records for the first user that generates a likelihood of the match above a first threshold. If the machine learning model returns a likelihood below the first threshold, then a manual matching process may be invoked, for example, where the top N (N=integer) most likely matches are presented to a user. However, if a match is found, then the process proceeds to 205 and replaces one or more of values in the second data record fields with one or more corresponding values in the fields from the identified one record. At 206, the second data record with new values is stored in a record in a database. As mentioned above, the new values in the second data taken from the transactional data may be used to match transactional data received at a later point in time, where the later received transactional data may include updated field values or new fields. Transactional data may thusly be stored with the second data in a single record, for example, in database 160 so that application 140 can advantageously access all related data from one record.

Figure 3:
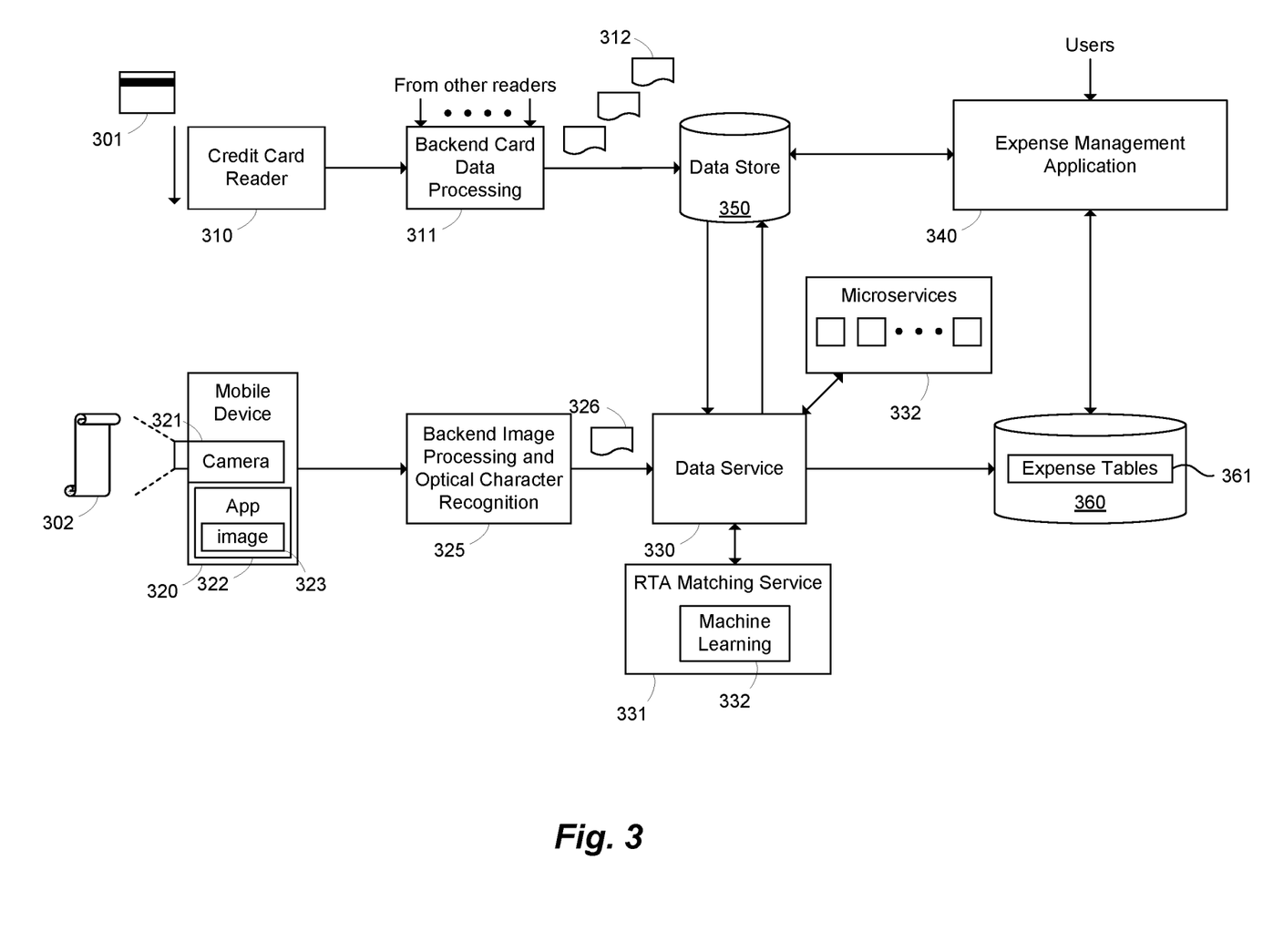
FIG. 3 illustrates a real-time feed authorization matching system according to an embodiment.

FIG. 3 illustrates a real-time feed authorization matching system according to an embodiment. Embodiments of the present disclosure may be applied to matching real-time credit card feeds with OCR data of receipts for each transaction. For example, a user may swipe a credit card 301 through a credit card reader 310. Credit card reader 310 generates a transactional data record and sends it to backend card data processing component 311. A receipt 302 is generated at the point of sale (POS). In this example, a user may invoke an expense application ("App") 322 on mobile device 320 and take a picture of the receipt 302 using camera 321. An image 323 of the receipt is then stored in the application 322. The image 323 is sent to backend image processing and optical character recognition (OCR) component 325. The output of component 325 is OCR data record 326, which is sent to data service 330. OCR data 326 may include fields, including but not limited to the following:

userId—Numeric value that, combined with entityId, uniquely identifies the user entityId—Numeric value that uniquely identifies a group of users in the application 340 (entity)

ocrText—A string containing the text extracted from the receipt image via OCR userExpenseTypes—A list of the expense types this user is allowed to utilize cteLoginId—The unique loginId/email address associated with this user's account in the Application OCR data 326 may be sent to data service 330 as a JSON object, for example.

Data service 330 may extract token values from receipt text by broadcasting the payload to a multitude of individual services (e.g., "microservices") 332 tasked with extracting specific tokens from the provided information, for example. These tokens may be extracted in parallel, and individual responses are then returned to the data service 330. Once all results are available, data service 330 composes a second JSON payload by merging these values and the input it initially had (listed above), and sends that to a matching service 331. The payload produced by that service is then returned to the initial data service 330 for storage in an expense table 361 in database 360. Unified data for related expense is thus available for an expense management application 340, for example.

Backend card data processing 311 may receive transactional data from a large number of other readers for many other users, for example. This transactional data 312 may then be periodically downloaded into a data store 350. Given a receipt represented as OCR data, the task of performing real time authentication (RTA) matching can be broken down into two steps. In this example, the system first performs a database look-up to retrieve a list of all available RTA feed entries (transactional data) for a particular user (e.g., identified by their cteLoginId). Next, the system iterates through that list of transactional data feeds and assigns to each transaction a binary label that represents whether or not they correspond to the same transaction depicted on the receipt. This process can result in four distinct scenarios:

1. The user has no corresponding RTA transactional data feed
2. The user has RTA transactional data but no match is found
3. The user has RTA transactional data and exactly one match is found
4. The user has RTA transactional data and multiple matches were found In this example, scenarios 1 and 2 share the same outcome. They represent transactions for which the system did not find an RTA match. In those cases, the system may return the originally extracted token values to the caller, for example. In scenario 3, where we find a unique match to the current transaction (as described in more detail below), the values for currency, date, and vendor in the response payload from the RTA matching service are replaced with those found in the matched RTA feed. This ensures that the system is returning the most reliable set of values, as the information found on credit card feeds may have a much higher rate of correctness in some applications than what is extracted from OCR text, for example. Along with the binary labels previously mentioned, the RTA matching model (described below) also produces a confidence (or likelihood) score that indicates how "certain" the machine learning model is that a particular feed is (or isn't) a match to a given receipt. In Scenario 4, where there are multiple matches, they system may choose the one with the highest confidence score and treat that as done with the single match of Scenario 3, for example.

In one example embodiment, the job of performing the actual match/not-match determination is assigned to a machine learning model 332 trained for that task. To carry out the training process, a dataset may be curated containing a random selection of 10,000 receipts, their corresponding RTA transactional data record match (positive class), and a random selection of 5 non-matches for each receipt (negative class), for example. Once that dataset was created, a set of features were then used for training. The following is a list of an example RTA credit card transactional data feed, an example OCR data for a receipt, and an example listing of features used for machine learning.

Example fields in an RTA transactional data record:

```
1 {
2 "TransactionCrnCode": "USD",
3 "LastSegment": "1234",
4 "TransactionType": "ATH",
5 "Description": "null",
6 "RequestID": "1654687873103717",
7 "LoginID": "user-email@entity.com",
```

-continued

```
8 "MerchantLegalName": "No Vendor Supplied",
9 "SpendCategory": "OTHER",
10 "MerchantID": "20441412318",
11 "MCC": "7119",
12 "MerchantState": "null",
13 "CardTypeCode": "AX",
14 "TransactionAmount": "31.2",
15 "MerchantCity": "Chicago",
16 "CompanyName": "Entity Name",
17 "MerchantName": "Neighborhood Restaurant",
18 "MerchantCtryCode": "US",
19 "MerchantPostalCode": "null",
20 "MerchantStreetAddress": "null",
21 "TransactionDate": "Wed Jan 17 21:52:28 PST 2017"
22 }
```

Example fields of OCR data record for a receipt:

```
1 {
2 "cteLoginID": "user-email@entity.com",
3 "extracted_amount": "31.2",
4 "extracted_currency": "USD",
5 "extracted_date": "ATH",
6 "extracted_vendor": "JASON DELI"
7 }
```

The following is a list of features and descriptions generated for machine learning analysis:

amount_similarity—Numeric value between 0 and 1 representing the degree of similarity between the OCR data and RTA transactional data feed amounts.

currency_similarity—A binary flag (1 or 0) denoting a match or mismatch between OCR data and RTA transactional data feed currency values.

date_similarity—A numeric value denoting the absolute number of days between the OCR data and RTA transactional data feed dates.

vendor_similarity—A score between 0 and 1 representing the similarity between the vendor name string extracted by the data service from the OCR data vendor field and its corresponding field in the RTA transactional data feed.

rta_feed_age—A value denoting the number of seconds that have passed since the RTA transactional data feed being evaluated was created.

The values for currency_similarity, date_similarity, and rta_feed_age are straightforward to compute and the logic for performing these calculations may be as illustrated in the following examples:

Currency_similarity: 1=same; 0=different;

Date_similarity: number of days between OCRdate and Transaction_date; and

Rta_feed_age: Treceipt−Treciept_upload.

In one example embodiment, the amount similarity is computed as follows. Let A denote the larger of the two amounts being compared, and B the smaller. amount_similarity is then defined as the ratio B/A.

In one example embodiment, computing the similarity score between the two vendor strings may include determining multiple similarities and selecting one, for example. For instance, when comparing strings such as BURGER KING and BURGER KING #01723 BELLEVUE WA, some approaches may yield a small similarity score since transforming one string to another requires a large number of edits. However, it can be seen that contextually these two strings can be said to represent the same vendor. With that in mind, the following logic may be used, where Va is the OCR data vendor and Vb is the vendor from the RTA transaction feed:

Define vendor_similarity as max(sim1; sim2; sim3), where:
Va=BURGER KING #01723 BELLEVUE WA
Vb=BURGER KING
Sim1=Sim(Va∩Vb, Va)=sim("BURGER KING", "BURGER KING #01723 BELLEVUE WA")
Sim2=Sim(Va∩Vb, Vb)=sim("BURGER KING", "BURGER KING")
Sim3=Sim(Va, Vb)=sim("BURGER KING #01723 BELLEVUE WA", "BURGER KING")

One example function for the "sim(x,y)" function is the edit distance, which is equal to a number of characters needed to make one string match the other, such that the higher the number, the more dissimilar the strings are. When evaluating for a match, the system may produce the above 5 similarity values for each feature and utilize that array as input to a Random Forest model that has been previously trained, for example.

Figure 4:
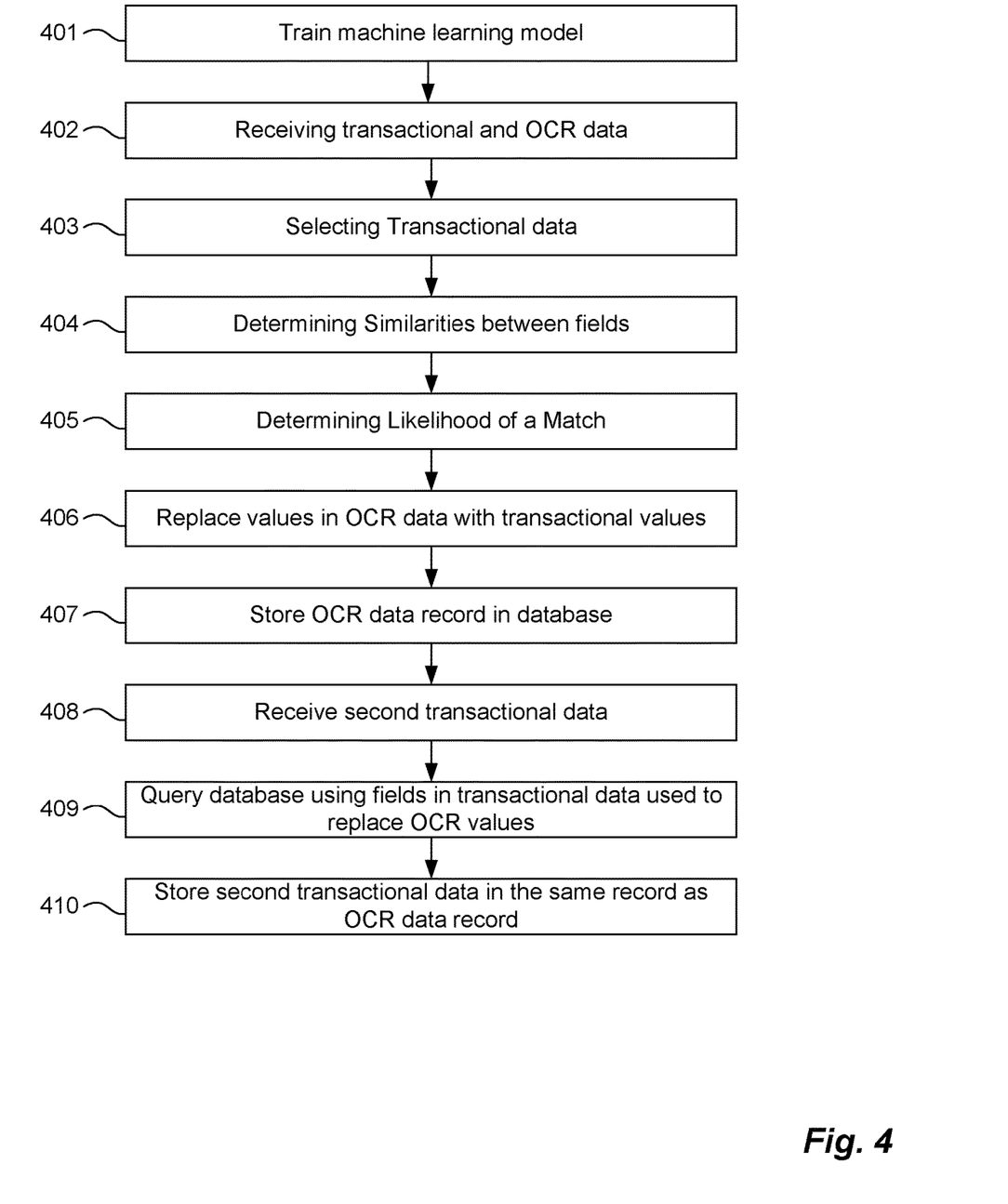
FIG. 4 illustrates real-time feed authorization matching according to an embodiment.

FIG. 4 illustrates real-time feed authorization matching according to an embodiment. In this example, the process starts with training a machine learning model at 401. For example, a machine learning model may be produced using a training set. In one embodiment, a first corpus of training data includes a plurality of transactional data records matching a plurality of second data. A second corpus of training data may include a plurality of transactional data records not matching a plurality of second data. As mentioned in the example above, the second corpus of data may be greater than the first corpus of data, where the second corpus is generated from the first corpus by associating transactional data records from the first corpus with non-matching second data, for example.

Data processing may start at 402, where transactional and OCR data is received. For example, transactional data may be received for a first user, where the transactional data comprises a plurality of records, and each record comprising a first plurality of fields. OCR data may be received at a later time, for example. OCR data for the first user may correspond to optical character recognition (OCR) of a physical transaction receipt from a picture of the receipt taken on a mobile device, for example. The OCR data may include a second plurality of fields corresponding to at least a portion of the first plurality of fields in the transactional data. As mentioned above, the transactional data may be a credit card data feed. One particular issue with such types of data is that the data may be encoded according to a first encoding scheme corresponding to a credit card service provider, for example. In one embodiment, the first plurality of fields includes a transaction amount, a date, a currency, a vendor, a time, and a plurality of other fields, for example. Accordingly, in such a case, the second plurality of fields includes at least a transaction amount, a data, a currency, a vendor, and a time.

At 403, transactional data records are selected for the first user from a data store of transactional data for a plurality of users. At 404, a plurality of similarities are determined between a plurality of fields from the first plurality of fields of each of the transactional data records for the first user and a corresponding plurality of fields from the second plurality of fields of OCR data for the first user. In one embodiment, determining at least one similarity of the plurality of similarities comprises determining a first, second, and third similarity. For example, the first similarity may comprise a similarity between a first character string and a second character string. For the first similarity, the first character string is an intersection of a first character field in the first plurality of fields and a corresponding first character field in the second plurality of fields. The second character string is the first character field, such that the first similarity is: Sim(Va∩Vb, Va), for vendor strings Va and Vb. The second similarity comprises a similarity between the first character string and a third character string, where the third character string is the second character field such that the second similarity is: Sim(Va∩Vb, Vb). The second similarity comprises a similarity between the first character field and the second character field such that the third similarity is: Sim(Va, Vb). Once the similarities are determined, then the process selects the maximum similarity from the first similarity, the second similarity, and the third similarity as the final similarity between the fields. In one example embodiment, the first and second character fields are vendor character fields. Additionally, the plurality of similarities further comprise a similarity based on a difference between an amount field in the first plurality of fields of transactional data and an amount field in the second plurality of fields of OCR data, a similarity based on a difference between a currency field in the first plurality of fields and a currency field in the second plurality of fields, a similarity based on a difference between a date field in the first plurality of fields and a date field in the second plurality of fields, and a similarity based on a difference between a transaction time field in the first plurality of fields and a time field in the second plurality of fields.

At 405, a likelihood of a match is determined between the first plurality of fields of the transactional data records for the first user and the second plurality of fields for the OCR data for the first user based on the selected maximum similarity and similarities between a plurality of other fields of the first and second plurality of fields using a random forest machine learning model. Accordingly, one record in the transactional data records is identified that corresponds to the OCR data for the first user. At 406, one or more of values in the second plurality of fields of OCR data is replaced with one or more corresponding values in the first plurality of fields from the identified one record of transactional data. In one example embodiment, replacing one or more of values in the second plurality of fields with one or more corresponding values from the first plurality of fields in the identified one record comprises replacing values in one or more of the date, currency, and vendor fields in the second plurality of fields with corresponding values from the date, currency, and vendor fields in the identified one record. At 407, the second plurality of fields of OCR data are stored in a record in a database.

At 408, second transactional data for the first user is received (e.g., after the OCR data has been stored). The second transactional data comprises a plurality of records, where each record comprises a first plurality of fields, for example. The second transactional data may correspond to the first transactional data, and it would be advantageous to store related data together, for example. A query may be generated to the database to match records in the second transactional data with the first previously received OCR data records. For example, one or more values replaced in the second plurality of fields from the identified one record may be the same as one or more values in corresponding fields in a first record of the second transactional data. Accordingly, related records may be accurately queried and the second transactional data corresponding to the first transactional data may be stored in the same record in the database, for example.

Figure 5:
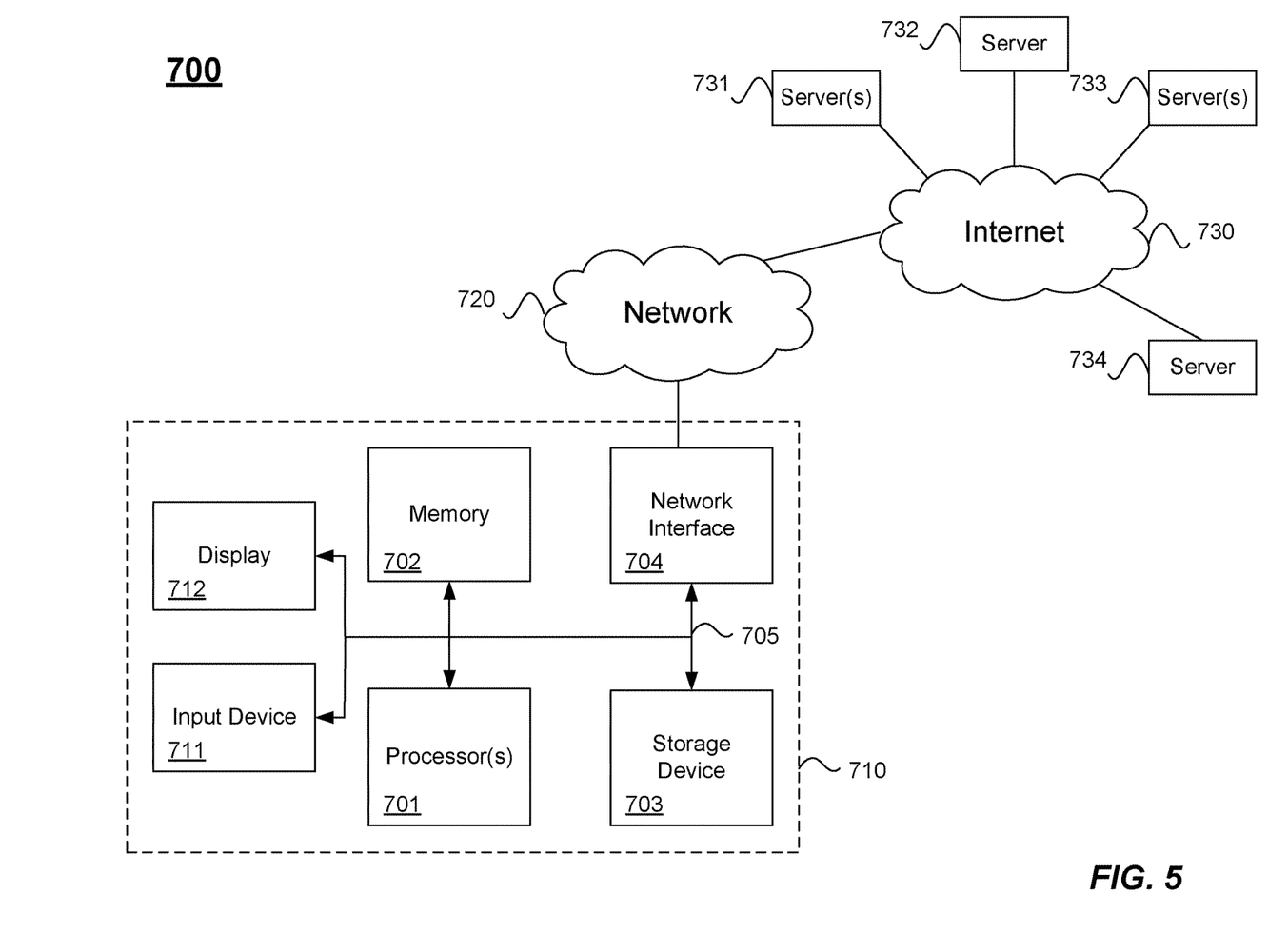
FIG. 5 illustrates computer system hardware configured according to the above disclosure.

FIG. 5 illustrates computer system hardware configured according to the above disclosure. The following hardware description is merely one illustrative example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device 503 and memory 502 are both examples of non-transitory computer readable storage mediums.

Computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a browser, for example, may access data and features on backend software systems that may reside on multiple different hardware servers on-prem 531 or across the Internet 530 on servers 532-535. One or more of servers 532-535 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
   training a machine learning model with a first corpus of training data comprising a first plurality of transactional data records matching a plurality of second data, the machine learning model configured to determine likelihoods of matches between fields;
   training the machine learning model with a second corpus of training data comprising a second plurality of transactional data records not matching the plurality of second data;
   receiving transactional data for a first user from a credit card feed, the transactional data comprising a plurality of transactional data records, and each record comprising a first plurality of fields;
   receiving second data for the first user, the second data comprising a second plurality of fields corresponding to at least a portion of the first plurality of fields, the second data corresponding to optical character recognition (OCR) data obtained from a physical transaction receipt corresponding to a transaction made by the first user;
   selecting transactional data records for the first user from a data store of transactional data for a plurality of users;
   determining a plurality of similarities between a plurality of fields from the first plurality of fields of each of the transactional data records for the first user and a corresponding plurality of fields from the second plurality of fields of second data for the first user, wherein similarities between different pairs of corresponding fields are determined according to different operations depending on a field type;
   providing the plurality of similarities as inputs to the machine learning model to cause the machine learning model to determine a likelihood of a match between the first plurality of fields of the transactional data records for the first user and the second plurality of fields for the second data for the first user;
   identifying one record in the transactional data records for the first user that generates said likelihood of the match above a first threshold, the one record in the transactional data records corresponding to the transaction made by the first user;
   replacing one or more of values in the second plurality of fields of the second data with one or more corresponding values in the first plurality of fields from the identified one record to form a modified second data; and
   storing the second plurality of fields of the modified second data in a record in a database.

2. The method of claim 1 wherein:
   the first plurality of fields includes a transaction amount, a date, a currency, a vendor, a time, and a plurality of other fields; and
   the second plurality of fields includes at least a transaction amount, a data, a currency, a vendor, and a time.

3. The method of claim 1 wherein the transactional data is encoded according to a first encoding scheme corresponding to a credit card service provider.

4. The method of claim 1 further comprising determining at least one similarity of the plurality of similarities comprising:
   determining a first similarity, the first similarity comprising a similarity between a first character string and a second character string, wherein the first character string is an intersection of a first character field in the first plurality of fields and a corresponding first character field in the second plurality of fields, and wherein the second character string is the first character field;
   determining a second similarity, the second similarity comprising a similarity between the first character string and a third character string, wherein the third character string is the second character field;

determining a third similarity, the third similarity comprising a similarity between the first character field and the second character field; and selecting the maximum similarity from the first similarity, the second similarity, and the third similarity.

5. The method of claim 4 wherein the first and second character fields are vendor character fields.

6. The method of claim 4 wherein the plurality of similarities further comprise:

a similarity based on a difference between an amount field in the first plurality of fields and an amount field in the second plurality of fields;

a similarity based on a difference between a currency field in the first plurality of fields and a currency field in the second plurality of fields;

a similarity based on a difference between a date field in the first plurality of fields and a date field in the second plurality of fields; and a similarity based on a difference between a transaction time field in the first plurality of fields and a time field in the second plurality of fields.

7. The method of claim 6 wherein replacing one or more of values in the second plurality of fields with one or more corresponding values from the first plurality of fields in the identified one record comprises replacing values in one or more of the date, currency, and vendor fields in the second plurality of fields with corresponding values from the date, currency, and vendor fields in the identified one record.

8. The method of claim 1 wherein the credit card feed is a feed of real-time credit card transactions.

9. The method of claim 1 further comprising:

receiving second transactional data for the first user, the second transactional data comprising a plurality of records, and each record comprising a first plurality of fields, wherein the second transactional data corresponds to the first transactional data; and generating a query to the database to match records in the second transactional data with the first previously received transactional data records, wherein one or more values replaced in the second plurality of fields from the identified one record are the same as one or more values in corresponding fields in a first record of the second transactional data so that the second transactional data corresponding to the first transactional data is stored in the same record in the database.

10. The method of claim 1 wherein the machine learning model is a random forest machine learning model.

11. The method of claim 1, wherein the second corpus of data is greater than the first corpus of data and wherein the second corpus is generated from the first corpus by associating transactional data records from the first corpus with non-matching second data.

12. A non-transitory machine-readable medium storing a program executable by at least one processing unit of a computer, the program comprising sets of instructions for:

training a random forest machine learning model with a first corpus of training data comprising a first plurality of transactional data records matching a plurality of second data, the random forest machine learning model configured to determine likelihoods of matches between fields;

training the random forest machine learning model with a second corpus of training data comprising a second plurality of transactional data records not matching the plurality of second data;

receiving transactional data for a first user from a credit card feed, the transactional data comprising a plurality of transaction data records, and each record comprising a first plurality of fields;

receiving OCR data for the first user corresponding to optical character recognition of a physical transaction receipt from a picture of the receipt taken on a mobile device, the OCR data comprising a second plurality of fields corresponding to at least a portion of the first plurality of fields, the physical transaction receipt corresponding to a transaction made by the first user;

selecting transactional data records for the first user from a data store of transactional data for a plurality of users;

determining a plurality of similarities between a plurality of fields from the first plurality of fields of each of the transactional data records for the first user and a corresponding plurality of fields from the second plurality of fields of OCR data for the first user, wherein similarities between different pairs of corresponding fields are determined according to different operations depending on a field type, wherein determining at least one similarity of the plurality of similarities comprises:

determining a first similarity, the first similarity comprising a similarity between a first character string and a second character string, wherein the first character string is an intersection of a first character field in the first plurality of fields and a corresponding first character field in the second plurality of fields, and wherein the second character string is the first character field;

determining a second similarity, the second similarity comprising a similarity between the first character string and a third character string, wherein the third character string is the second character field;

determining a third similarity, the third similarity comprising a similarity between the first character field and the second character field; and selecting the maximum similarity from the first similarity, the second similarity, and the third similarity;

providing the maximum similarity and similarities between a plurality of other fields of the first and second plurality of fields as inputs to the random forest machine learning model to cause the random forest machine learning model to determine a likelihood of a match between the first plurality of fields of the transactional data records for the first user and the second plurality of fields for the OCR data for the first user based on the selected maximum similarity and similarities between a plurality of other fields of the first and second plurality of fields;

identifying one record in the transactional data records that corresponds to the OCR data for the first user, the one record in the transactional data records corresponding to the transaction made by the first user; and replacing one or more of values in the second plurality of fields of the OCR data with one or more corresponding values in the first plurality of fields from the identified one record to form a modified OCR data.

13. The non-transitory machine-readable medium of claim 12 wherein:

the first plurality of fields includes a transaction amount, a date, a currency, a vendor, a time, and a plurality of other fields; and the second plurality of fields includes at least a transaction amount, a data, a currency, a vendor, and a time.

14. The non-transitory machine-readable medium of claim 12, wherein the second corpus of data is greater than the first corpus of data and wherein the second corpus is generated from the first corpus by associating transactional data records from the first corpus with non-matching second data.

15. The non-transitory machine-readable medium of claim 12 further comprising:

receiving second transactional data for the first user, the second transactional data comprising a plurality of records, and each record comprising a first plurality of fields, wherein the second transactional data corresponds to the first transactional data; and generating a query to the database to match records in the second transactional data with the first previously received transactional data records, wherein one or more values replaced in the second plurality of fields from the identified one record are the same as one or more values in corresponding fields in a first record of the second transactional data so that the second transactional data corresponding to the first transactional data is stored in the same record in the database.

16. A computer system comprising:

a processor; and a non-transitory machine-readable medium storing a program executable by the processor, the program comprising sets of instructions for:

training a machine learning model with a first corpus of training data comprising a first plurality of transactional data records matching a plurality of second data, the machine learning model configured to determine likelihoods of matches between fields;

training the machine learning model with a second corpus of training data comprising a second plurality of transactional data records not matching the plurality of second data;

receiving transactional data from a credit card feed for a first user, the transactional data comprising a plurality of transactional data records, and each record comprising a first plurality of fields;

receiving second data for the first user, the second data comprising a second plurality of fields corresponding to at least a portion of the first plurality of fields, the second data corresponding to optical character recognition (OCR) data obtained from a physical transaction receipt corresponding to a transaction made by the first user;

selecting transactional data records for the first user from a data store of transactional data for a plurality of users;

determining a plurality of similarities between a plurality of fields from the first plurality of fields of each of the transactional data records for the first user and a corresponding plurality of fields from the second plurality of fields of second data for the first user, wherein similarities between different pairs of corresponding fields are determined according to different operations depending on a field type;

providing the plurality of similarities as inputs to the machine learning model to cause the machine learning model to determine a likelihood of a match between the first plurality of fields of the transactional data records for the first user and the second plurality of fields for the second data for the first user;

identifying one record in the transactional data records for the first user that generates said likelihood of the match above a first threshold, the one record in the transactional data records corresponding to the transaction made by the first user;

replacing one or more of values in the second plurality of fields of the second data with one or more corresponding values in the first plurality of fields from the identified one record to form a modified second data; and storing the second plurality of fields of the modified second data in a record in a database.

17. The computer system of claim 16 wherein:

the first plurality of fields includes a transaction amount, a date, a currency, a vendor, a time, and a plurality of other fields; and the second plurality of fields includes at least a transaction amount, a data, a currency, a vendor, and a time.

18. The computer system of claim 16 wherein the transactional data is encoded according to a first encoding scheme corresponding to a credit card service provider.

19. The computer system of claim 16 wherein the machine learning model is a random forest machine learning model.

20. The computer system of claim 16 further comprising:

receiving second transactional data for the first user, the second transactional data comprising a plurality of records, and each record comprising a first plurality of fields, wherein the second transactional data corresponds to the first transactional data; and generating a query to the database to match records in the second transactional data with the first previously received transactional data records, wherein one or more values replaced in the second plurality of fields from the identified one record are the same as one or more values in corresponding fields in a first record of the second transactional data so that the second transactional data corresponding to the first transactional data is stored in the same record in the database.

* * * * *